United States Patent Office 3,809,670
Patented May 7, 1974

3,809,670
POLYAMIDES
Winston Costain and Vincent Matthews, both c/o ICI Industries, Ltd., Hexagon House, Blackley, Manchester, England
No Drawing. Continuation-in-part of abandoned application Ser. No. 69,460, Sept. 3, 1970. This application July 25, 1972, Ser. No. 274,953
Int. Cl. C08g 51/04
U.S. Cl. 260—37 N                 13 Claims

ABSTRACT OF THE DISCLOSURE

The aqueous dispersion of titanium dioxide added to polyamide-forming ingredients prior to or during polycondensation to give titanium dioxide delustered polyamides is prepared using alkali metal metasilicate as dispersing agent.

---

This invention, which is a continuation-in-part application of copending application Ser. No. 69,460, filed Sept. 3, 1970, now abandoned, relates to synthetic linear polyamides and especially to synthetic linear polyamides delustered with titanium dioxide.

By synthetic linear polyamides we mean in particular those compounds obtained by the polycondensation of aminocarboxylic acids (or by polymerization of the lactams of such aminocarboxylic acids) or by the polycondensation of mixtures of diamines with dicarboxylic acids, especially those compounds known generically as the nylons of which nylon 6 (polycaprolactam) and nylon 6,6 (polyhexamethylene adipamide) are well known typical examples.

It is already known to pigment synthetic linear polyamides by adding an aqueous dispersion of titanium dioxide to the polyamide-forming ingredients prior to the polycondensation reaction, or at some stage during the polycondensation, and then completing the polycondensation by heating, during which the water in the aqueous pigment dispersion, together with any water present in the polyamide-forming ingredients and water formed in the polycondensation reaction, is allowed to escape as steam. Aqueous dispersions of titanium dioxide for this purpose have been prepared using alkali metal polyphosphates, for example sodium hexametaphosphate, as the dispersing agent.

Unfortunately when such polyphosphates or other oxy acids of phosphorus or salts thereof are present in the polyamide, there is a tendency for the titanium dioxide to flocculate in the molten polyamide. This leads to difficulty in spinning the molten polyamide to give filaments. In the first place the molten polyamide is filtered, usually through a filter pack, before passing to the spinnerette. When the titanium dioxide is flocculated the filter pack tends to become blocked easily, and hence requires replacement at frequent intervals, so interfering with the rate of production of filament. In the second place filament containing flocculated titanium dioxide may be difficult to draw into yarn, since on drawing some of the titanium dioxide separates or is shed from the filament, and the filament is weakened and liable to breakage.

It has been customary for some time, where the synthetic linear polyamide is to be converted to fibrous form, in certain cases to incorporate in the polyamide an oxy acid of phosphorus, or a salt thereof, in order to stabilize the polyamide against the degradative effects of exposure to heat, light or the oxygen of the air, along or in combination. Suitable oxy acids of phosphorus are the various forms of phosphoric, phosphorous and hypophosphorous acids, and suitable salts include the alkali metal and organic amine salts. The oxy acid of phosphorous is frequently used in conjunction with a manganese compound, and a manganese salt, especially a manganous salt, of the oxy acid of phosphorus may be employed, for example manganous phosphate or manganous hypophosphite. These oxy acids of phosphorus or their salts also tend to cause flocculation of titanium dioxide in the molten polyamide.

We have now found that these difficulties caused by flocculation of titanium dioxide in the polymer may be reduced or obviated if the aqueous dispersion of titanium dioxide which is added to the polyamide-forming ingredients is prepared using an alkali metal metasilicate, especially sodium metasilicate, as the dispersing agent.

Thus our invention provided a process for the manufacture of a titanium dioxide delustered synthetic linear polyamide which comprises the steps of (1) preparing a dispersion of uncoated titanium dioxide in water using an alkali metal metasilicate as the dispersing agent, (2) adding the resulting aqueous dispersion of titanium dioxide to an aqueous medium containing polyamide-forming ingredients which give rise to a synthetic linear polyamide on polycondensation, and (3) effecting polycondensation to the said polyamide by heating the resulting mixture until polycondensation is complete, allowing water present in the mixture and formed during the polycondensation to escape as steam.

The alkali metal metasilicate used in preparing the aqueous dispersion of titanium dioxide is usually sodium metasilicate. The aqueous dispersion may be made by agitating the titanium dioxide in water containing the silicate. Agitation may be by simple stirring but any of the known mechanical means of milling or homogenization may be employed. The agitation must, however, be of a type and duration such that precipitation of sodium metasilicate is not caused, and consequently, a coating of the titanium dioxide particles with hydrated oxide. Preferably, agitation has a time duration of not more than about 15 minutes. In particular milling with gravel or with glass beads gives good results. Whilst the amount of silicate used may vary widely, a suitable quantity varies between 0.1% and 1% by weight of the weight of the titanium dioxide. The concentration of the uncoated titanium dioxide in the dispersion may vary widely; it may be as low as 1% by weight or even less, or as high as 50% by weight or even higher. It should be understood that the term "uncoated titanium dioxide" as employed herein means titanium dioxide particles substantially devoid of hydrated oxide coating.

Polyamide-forming ingredients include aminocarboxylic acids and the lactams thereof, and mixtures of diamines with dicarboxylic acids, if desired in the form of salt of the diamine with the dicarboxylic acid. Caprolactam and hexamethylene diammonium adipate are examples of suitable polyamide-forming ingredients. In the context of this invention polyamide-forming ingredients also include partially condensed products from the initial polyamide-forming starting materials; that is to say the uncoated titanium dioxide dispersion may be added during the polycondensation instead of to the initial polyamide-forming starting materials before polycondensation is initiated.

The amount of uncoated titanium dioxide dispersion added to the polyamide-forming ingredients is such as to give the desired loading of uncoated titanium dioxide in the finished polymer. The uncoated titanium dioxide loading in the polymer may vary widely from very low values such as 0.02% by weight up to high values such as 5% by weight.

Polycondensation to give the synthetic linear polyamide may be effected by methods well-known to the art. Thus the aqueous mixture of the titanium dioxide dispersion and the polyamide-forming ingredients may be heated in a closed system, but with provision for the controlled release of water vapour, until the temperature of the mixture reaches that at which polycondensation is complete, normally between 220° and 300° C. The resulting polyamides may be melt spun into filaments or fibres by methods well known in the art.

In polyamides made by the process of our invention using an alkali metal metasilicate for dispersing the titanium dioxide, the uncoated titanium dioxide is more finely dispersed in the polymer than in the case where a polyphosphate is used for dispersing the titanium dioxide with consequent advantages in the spinning performance of the polymer particularly on the manufacturing scale.

It has been proposed to use certain amines as dispersing agents in the preparation of aqueous dispersions of titanium dioxide prior to adding to polyamide-forming ingredients and effecting polycondensation thereof. These amines, however, are liable to air oxidation when aqueous dispersions of titanium dioxide containing them are kept agitated prior to adding to the polyamide-forming ingredients with resulting flocculation and precipitation of the titanium dioxide. Moreover, the resulting delustered polyamides have an increased tendency to gel when kept in the molten state prior to melt spinning. Compared with these amine dispersing agents, alkali metal metasilicates are not liable to air oxidation in aqueous dispersions of uncoated titanium dioxide, and have less tendency to promote the gelling of polyamides containing them.

The polyamides made by the process of our invention may also contain other additives. Thus they may contain oxy acids of phosphorus or salts thereof as stabilizers, and it is an advantage of our invention that the usual deleterious effect of such additives on the degree of dispersion of the titanium dioxide in the polymer is reduced when a metasilicate is used as the dispersing agent for uncoated titanium dioxide. They may also contain compounds of manganese, which are frequently added to titanium dioxide delustered polyamide to offset the deleterious effect of the titanium dioxide on the stability of the polyamide to exposure to light.

A further advantage of our invention is that the alkali metasilicate imparts some protection to the polymer against degradation by oxidation.

The titanium dioxide used in the process of our invention may be in the anatase or rutile form.

The polyamides made by the process of our invention may also contain antioxidants, especially phenolic antioxidants, and viscosity stabilizers such as acetic acid.

The invention is illustrated but not limited by the following examples in which the parts and percentages are by weight.

EXAMPLE I

Titanium dioxide (120 parts) water (180 parts) and sodium metasilicate (0.24 part; 0.2% by weight of the titanium dioxide) were milled together with glass beads for 15 minutes, and the resulting dispersion filtered and kept continuously agitated until used.

5,240 parts of nylon 6.6 salt (hexamethylenediammonium adipate), 2,500 parts of distilled water, 22.7 parts of 26.4% aqueous acetic acid solution, 2.26 parts of 1,1,3-tris(2'-methyl-4'-hydroxy-5'-tert. butyl phenyl) butane and 6.72 parts of sodium hypophosphite were heated in an autoclave to a temperature of about 215° C. and a pressure of 250 lb. per square inch. The heating was continued and the pressure maintained at 250 lbs. per square inch by bleeding off steam. At a temperature of 220° C. 226 parts of the uncoated titanium dioxide dispersion prepared as above were added via a lock. When a temperature of 240° C. was reached, the pressure was gradually reduced to atmospheric during 60 minutes, after which time the temperature had risen to about 270° C. As soon as atmospheric pressure was reached a slow stream of nitrogen was passed through the autoclave, after a further 10 minutes holding period at a temperature of 270° C. the polymer was extruded from the autoclave under nitrogen pressure as ribbon and quenched with water. The polymer ribbon was then converted into chip form.

The polymer chip was then melt spun into filaments and the filaments drawn into yarn. The degree of dispersion of the titanium dioxide both in the polymer chip and in the yarn was assessed by microscopic examination of microtome sections. The resistance of the yarns to oxidation was assessed by subjecting them to air oxidation at 220° C. for 27 seconds, and determining the loss in the amine end group content of the polymer, this being a measure of the degree of degradation. The discoloration during the oxidation test was also assessed by measuring the b-chromaticity of the yarn before and after the test, the loss in b-chromaticity being a measure of the discoloration.

EXAMPLE 2

The procedure of Example 1 was repeated except that the amount of sodium metasilicate used was 0.6 part (0.5% by weight on the weight of the titanium dioxide). The results are shown in the table following the examples.

EXAMPLE 3

For comparative purposes, the procedure of Example 1 was repeated except that 0.24 part of sodium hexametaphosphate were used in place of the sodium metasilicate. The results are shown in the following table.

| | Example 1 | Example 2 | Example 3 |
|---|---|---|---|
| Dispersing agent | Sodium metasilicate | Sodium metasilicate | Sodium hexametaphosphate |
| Amount, as percent of weight of titanium dioxide | 0.2 | 0.5 | 0.2 |
| Degree of dispersion of titanium dioxide in polymer chip | Good | Good | (¹) |
| Degree of dispersion of titanium dioxide in yarn | Good | Good | (¹) |
| Spinning and drawing properties | Good | Good | Good |
| Percent amine end group loss on oxidation | 40.3 | 35.9 | 40.7 |
| b-Chromaticity: | | | |
| Before oxidation | 0.324 | 0.320 | 0.324 |
| After oxidation | 0.304 | 0.302 | 0.299 |
| Difference | 0.020 | 0.018 | 0 025 |

¹ Fair.

What is claimed is:

1. A process for the manufacture of a titanium dioxide delustered synthetic linear polyamide using an alkali metal silicate as a dispersing agent for the titanium dioxide, the process comprising the steps of (1) preparing an aqueous dispersion of alkali metal metasilicate dispersed titanium dioxide by agitating said titanium dioxide and said alkali metal metasilicate in water, the agitation being of a type and duration such that precipitation of sodium metasilicate and coating of said titanium dioxide with hydrated oxide is not caused, (2) adding the resulting aqueous dispersion of titanium dioxide to an aqueous medium containing polyamide-forming ingredients which give rise to a synthetic linear polyamide on polycondensation, and (3) effecting polycondensation to the said polyamide by heating the resulting mixture until polycondensation is complete, allowing water present in the mixture and formed during the polycondensation to escape as steam.

2. A process as claimed in claim 1 in which Step (3) is effected by heating the mixture produced in Step (2) in a closed system, but with provision for the controlled release of water vapor, until the temperature reaches the temperature in the range 200° C. to 300° C. at which polycondensation is complete.

3. A process as claimed in claim 1 in which the amount of alkali metal metasilicate used varies between 0.1% and 1% by weight of the weight of the titanium dioxide.

4. A process as claimed in claim 1 in which the concentration of titanium dioxide in the aqueous dispersion varies between 1% and 50% by weight.

5. A process as claimed in claim 1 in which the amount of the aqueous dispersion of titanium dioxide added in Step (2) is such that the amount of titanium dioxide in the polyester at the conclusion of Step (3) falls within the range 0.02% to 5% by weight.

6. A process as claimed in claim 1 in which the polyamide-forming ingredient is an aminocarboxylic acid or a lactam thereof.

7. A process as claimed in claim 1 in which the polyamide-forming ingredient is a mixture of a diamine with a dicarboxylic acid, if desired in the form of a salt of the diamine with the dicarboxylic acid.

8. The process of claim 1 wherein said agitating is mechanical agitating for not more than 15 minutes.

9. A process as claimed in claim 6 in which the polyamide-forming ingredient is caprolactam.

10. A process as claimed in claim 7 in which the polyamide-forming ingredient is hexamethylene diammonium adipate.

11. A process as claimed in claim 1 in which the polyamide-forming ingredients are partially condensed.

12. A process as claimed in claim 1 in which the alkali metal metasilicate is sodium metasilicate.

13. A process as claimed in claim 1 in which the resulting titanium dioxide delustered synthetic linear polyamides are melt spun into filaments.

References Cited

UNITED STATES PATENTS

| | | | |
|---|---|---|---|
| 2,341,759 | 2/1944 | Catlin | 260—37 |
| 3,533,984 | 10/1970 | Yamanote | 260—37 |
| 3,212,911 | 10/1965 | Bernstein | 106—300 |

OTHER REFERENCES

Soluble Silicate, Vail, pp. 282–300, 1952.

ALLAN LIEBERMAN, Primary Examiner

R. ZAITLEN, Assistant Examiner

U.S. Cl. X.R.

260—37 NP